United States Patent
Sugaya (10) Patent No.: US 11,263,464 B2
(45) Date of Patent: Mar. 1, 2022

(54) IMAGE PROVIDING SYSTEM, METHOD, AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 156 days.

(21) Appl. No.: 16/623,250

(22) PCT Filed: Jun. 29, 2017

(86) PCT No.: PCT/JP2017/024019
§ 371 (c)(1),
(2) Date: Apr. 2, 2020

(87) PCT Pub. No.: WO2019/003396
PCT Pub. Date: Jan. 3, 2019

(65) Prior Publication Data
US 2021/0142071 A1    May 13, 2021

(51) Int. Cl.
*G06K 9/00* (2006.01)
*G06T 7/11* (2017.01)
(Continued)

(52) U.S. Cl.
CPC ........ *G06K 9/00771* (2013.01); *B64C 39/024* (2013.01); *G06K 9/3233* (2013.01);
(Continued)

(58) Field of Classification Search
CPC ............. G06K 9/00771; G06K 9/3233; G06K 2209/21; G06K 9/0063; G06T 7/11;
(Continued)

(56) References Cited

U.S. PATENT DOCUMENTS 9,509,894 B1 * 11/2016 Dyer .................. G06K 9/00791
2015/0168144 A1    6/2015 Barton et al.
(Continued)

FOREIGN PATENT DOCUMENTS

JP    2009265277 A    11/2009
JP    2010044642 A    2/2010
(Continued)

OTHER PUBLICATIONS

International Search Report issued in PCT/JP2017/024019 dated Aug. 29, 2017.

*Primary Examiner* — Jerome Grant, II
(74) *Attorney, Agent, or Firm* — Norton Rose Fulbright US LLP; James R. Crawford

(57) ABSTRACT

Provided is a system protecting privacy or the like of a land owner when providing an image taken by an unmanned flying object to the public (1) includes an unmanned aerial vehicle (10) and a computer (30). A control unit (14) in the unmanned aerial vehicle (10) executes an image acquisition module (141) to acquire an aerial image including positional information. A control unit (32) in the computer (30) executes a region designation module (321) to set a region where viewing is to be restricted. The control unit (32) executes a condition setting module (332) to set conditions for canceling the viewing restriction and set the conditions in a viewing authorization database (332). The control unit (32) executes a provision module (323) to provide an aerial image which includes the region where viewing is restricted.

6 Claims, 6 Drawing Sheets

(1) Correction in the X-axis direction (2) Correction in the Y-axis direction (51) Int. Cl.
*B64C 39/02* (2006.01)
*G06K 9/32* (2006.01)
(52) U.S. Cl.
CPC .......... *G06T 7/11* (2017.01); *B64C 2201/123* (2013.01); *G06K 2209/21* (2013.01); *G06T 2207/10032* (2013.01); *G06T 2207/30181* (2013.01)
(58) Field of Classification Search
CPC . G06T 2207/10032; G06T 2207/30181; B64C 39/024; B64C 2201/123; B64C 2201/127; H04N 7/18; G06Q 50/10; G09B 29/00
USPC ........................................................ 382/103
See application file for complete search history.

(56) References Cited

U.S. PATENT DOCUMENTS

| | | | |
|---|---|---|---|
| 2018/0308367 A1* | 10/2018 | Zhang | G08G 5/0069 |
| 2018/0324546 A1* | 11/2018 | Jones | G08G 5/006 |
| 2019/0373405 A1* | 12/2019 | Jones | H04L 61/35 |
| 2019/0392596 A1* | 12/2019 | Yang | G06T 5/005 |

FOREIGN PATENT DOCUMENTS

| | | | | |
|---|---|---|---|---|
| JP | 2013210546 A | 10/2013 | | |
| JP | 2015188150 A | 10/2015 | | |
| JP | 2016119629 A | 6/2016 | | |
| JP | 2016533736 A | 11/2016 | | |
| JP | 2017016388 A | 1/2017 | | |
| WO | WO201502731 | * | 7/2015 | ............. H04N 7/185 |

* cited by examiner

(1) Correction in the X-axis direction (2) Correction in the Y-axis direction

Viewing authorization database 332

| Region No. | Viewing restriction region | Viewing condition | | |
|---|---|---|---|---|
| | | Owner | Password | Public |
| 1 | X direction: from Xa to Xb<br>Y direction: from Ya to Yb | Taro Yamada<br>(Registration No. 1) | 24cMfDfd | Can be viewed |
| 2 | X direction: from Xc to Xd<br>Y direction: from Yc to Yd | Unknown | o8N0vOcD | Cannot be viewed |
| 3 | X direction: from Xe to Xf<br>Y direction: from Ye to Yf | Suzuki Hanako<br>(Registration No. 1) | IhmLzaGx | Cannot be viewed |

FIG. 5

Owned land information database 333

| Registration No. | Member No. | Name | Address | Coordinates | |
|---|---|---|---|---|---|
| | | | | Altitude (X coordinate) | Longitude (Y coordinate) |
| 1 | 123456 | Taro Yamada | XX county XX City ΔΔ 123-4 | Xa | Ya |
| 2 | Non-member | Suzuki Hanako | XX county XX City ΔΔ 123-5 | Xe | Yf |
| ⋮ | ⋮ | ⋮ | ⋮ | ⋮ | ⋮ |

FIG. 6

A third party displays the aerial image

IMAGE PROVIDING SYSTEM, METHOD, AND PROGRAM

This application is a national phase under 35 U.S.C. § 371 of International Application No. PCT/JP2017/024019 filed Jun. 29, 2017, the entire contents of which is incorporated herein by reference in its entirety.

TECHNICAL FIELD

The present invention relates to an image providing system, method and program.

BACKGROUND

To date, a system for systematically collecting images of a region regardless of location and time of image taking has been proposed. In such a system, a drone may be used for taking images of a street from the air.

For example, a solution is proposed, in which this system is used for generating an album of images of a region as a whole (see Patent Document 1).

However, especially in recent years, the resolution of images taken is so high that a third party who is not the album user may be identified from the images taken or that the number plate of a vehicle may be identified from the images taken. Information of the third-party who is not the album user, the number plate information of a vehicle and the like are not only unnecessary for most user, but may also infringe privacy. The solution is thus not preferable. Therefore, the following solution is proposed: with the well-known image processing technology, the face of the person taken in the image is blurred or even the person as a whole is erased through silhouettes or background image replacement, and then the image is provided to the public.

In addition, since images in which the family, friends or the like of a user are taken are of memorial significance for the user, the following solution is proposed: there may also be a method which may allow the user who uploads the images or other users authorized by the user to view the blurred or erased regions on the images.

PRIOR ART DOCUMENTS

Patent Documents

Patent Document 1: Japanese Patent Publication No. JP2017-016388

SUMMARY

Problems to be solved in the present invention

However, new problems will arise when an image taken by an aerial image taking system of a street in a region is widely viewed to the public rather than a user who has a closed relationship such as an album of the entire region.

For example, when a specified region is taken into an aerial image as a whole and widely disclosed to the public, a demand may generate: regardless of a house, a building, a farm field and the like, the owner of the land taken into the aerial image is unwilling to disclose the aerial image to a third party. Ideally, the aerial image is widely disclosed to the third party after the permission for disclosing the aerial image to the third party is obtained from all owners of the lands. However, the wider the region in the aerial image, the more objects whose permission needs to be obtained, and thus the labor becomes immeasurable. On the other hand, in the case of disclosure without permission, the problem of protecting the privacy is not sufficiently taken into consideration. Therefore, it is required to provide a system that can reduce labor required for obtaining permission as much as possible and sufficiently take into consideration the privacy and intention of the owner of the land which is taken into the aerial image.

The present invention is proposed in view of such a demand, and provides a system taking into consideration the privacy and intention of a land owner when an image taken by an unmanned aerial vehicle is widely provided to the public in a state in which labor consumed for obtaining the permission is reduced as much as possible.

Solution to Solve the Problem

In the present invention, the following solution is provided.

The invention of the first feature provides an image providing system providing an image taken by an unmanned aerial vehicle. The image providing system includes: an image acquisition module, which is configured to acquire an aerial image including positional information from the unmanned aerial vehicle; a region designation module, which is configured to set regions of the aerial image where viewing is restricted; a condition setting module, which is configured to set a condition for canceling the viewing restriction and granting viewing authorization for each region where viewing is restricted; and a provision module, which is configured to provide an aerial image which includes the region where viewing is restricted, and for the aerial image which includes the region where viewing is restricted, display a region where the condition for granting viewing authorization is satisfied while not display a region where the conditions for granting viewing authorization is not satisfied.

According to the invention of the first feature, in the aerial image taken by the unmanned aerial vehicle, viewing is restricted in a specified region. The condition for canceling the viewing restriction and granting viewing authorization is set for each of the regions where viewing is restricted. A processed aerial image is provided: an aerial image which includes the regions where viewing is restricted, and for the aerial image which includes the regions where viewing is restricted, display a region where the conditions is satisfied while not display a region where the conditions is not satisfied.

Therefore, a system in which hardware and software cooperate with each other and in which a condition for canceling viewing restriction and granting viewing authorization is set to conditions that take into consideration the privacy and intention of the owner of the land taken into the aerial image when images taken in a wide range by an unmanned aerial vehicle are widely provided to the public can be provided. Once the condition is set, there is no need to consume labor to obtain permission, and thus a system which can reduce labor consumed for obtaining permission as much as possible and sufficiently take into consideration the privacy and intention of the owner of the land which is taken into the aerial image can be provided.

According to the invention of the first feature, the invention of a second feature provides an image providing system. The image providing system further includes a reception module which is configured to receive information on an owned land from a user, where the conditions include a condition in which the region where viewing is restricted is consistent with the owned land.

According to the invention of the second feature, a system in which hardware and software cooperate with each other and in which the setting of a condition for canceling viewing restriction and granting viewing authorization becomes automatic through the reception of the information on the owned land from the user can be provided. Therefore, the labor consumed for obtaining permission of the land owner can be further reduced.

According to the invention of the first or second feature, the invention of a third feature provides an image providing system. The image providing system further includes a position acquisition module, which is configured to acquire positional information of the aerial image from a position detected by a position detection device disposed in the unmanned aerial vehicle, a height of the unmanned aerial vehicle and an image shooting angle of an image taking device disposed in the unmanned aerial vehicle.

According to the invention of the third feature, the positional information of the aerial image may also be correct even in the case in which the unmanned aerial vehicle does not take the image below itself (in the gravity direction) but takes the image in a tilted direction. Therefore, a deviation between the land owner predicted from the positional information included in the aerial image and the actual land owner may be suppressed, and thus a system which can reduce labor consumed for obtaining permission as much as possible and further take into consideration the privacy and intention of the owner of the land which is taken into the aerial image can be provided.

Invention Effect

The present invention can provide a system taking into consideration the privacy and intention of the owner of the land which is taken into the aerial image when an image taken by an unmanned aerial vehicle is widely provided to the public in a state in which labor consumed for obtaining the permission is reduced as much as possible.

DETAILED DESCRIPTION

Embodiments for implementation of the present invention will now be explained with reference to the drawings. It is to be noted that the embodiments are illustrative only, and the scope of the present invention is not limited thereto.

Configuration of the Image Providing System 1

Figure 1:
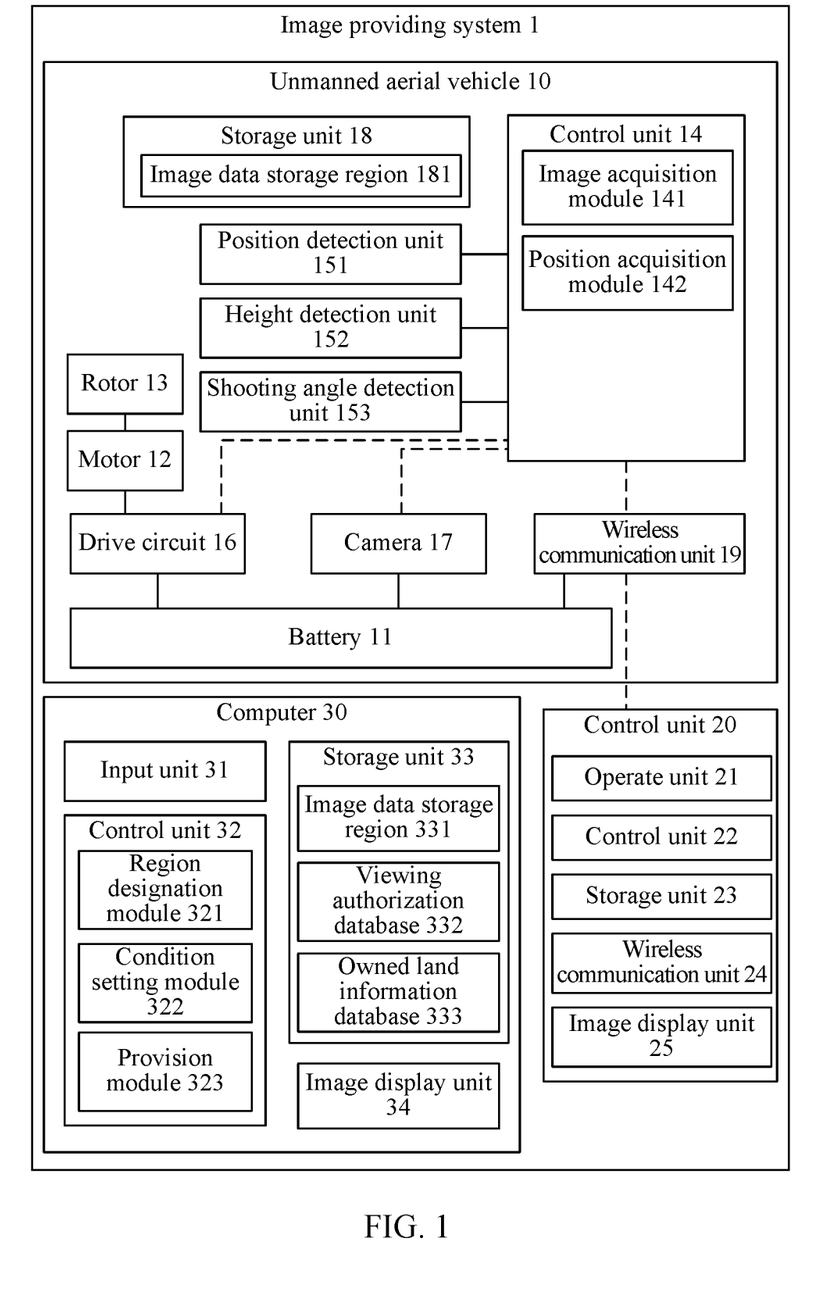
FIG. 1 is a block diagram illustrating hardware configuration and software functions of an image providing system 1 of an unmanned aerial vehicle 10 in an embodiment.

FIG. 1 is a block diagram illustrating hardware configuration and software functions of an image providing system 1 in this embodiment. The image providing system 1 includes: an unmanned aerial vehicle 10, which is provided with an aerial device; a controller 20, which is connected to the unmanned aerial vehicle 10 for wireless communication to control the unmanned aerial vehicle 10; and a computer 30, which executes various instructions which take into consideration the privacy and intention of the owner of the land which is taken into the aerial image. It is to be noted that in this embodiment, the unmanned aerial vehicle 10 may be appropriately operated automatically. In a case of automatically operating the unmanned aerial vehicle 10, the controller 20 may not be disposed.

Unmanned Aerial Vehicle 10

The unmanned aerial vehicle 10 is a device which can take images of an object in the air, which is not specifically limited. For example, the unmanned aerial vehicle 10 may be a radio remote-control aircraft, or may be an unmanned aerial vehicle called a drone. The unmanned aerial vehicle 10 will be described as a drone hereinafter.

The unmanned aerial vehicle 10 is provided with: a battery 11, which supplies electric power to the unmanned aerial vehicle 10; a motor 12, which operates using the electric power supplied by the battery 11; and a rotor 13, which rotates due to the operation of the motor 12 so as to make the unmanned aerial vehicle 10 take off and fly.

In addition, the unmanned aerial vehicle 10 is provided with: a control unit 14, which is configured to control the unmanned aerial vehicle 10; a position detection unit 151, which is configured to transmit positional information of the unmanned aerial vehicle 10 to the control unit 14; a height detection unit 152, which is configured to transmit the height of the unmanned aerial vehicle 10 to the control unit 14; a shooting angle detection unit 153, which is configured to transmit a shooting angle of a camera 17 disposed in the unmanned aerial vehicle 10 to the control unit 14; a drive circuit 16, which is configured to drive the motor 12 according to a control signal sent from the control unit 14; a camera 17, which is configured to take an aerial image of a photographed object according to the control signal sent from the control unit 14; and a storage unit 18, which is configured to pre-store control programs executed by a microcomputer of the control unit 14 and store images taken by the camera 17.

The unmanned aerial vehicle 10 is provided with a wireless communication unit 19 which is configured to execute wireless communication with the controller 20.

These configuration components are disposed in a body structure in a specified shape (frame, etc.). The body structure in a specified shape (frame, etc.) may adopt the same structure as the existing drone.

Battery 11

The battery 11 is a primary or secondary battery and supplies electric power to various configuration components in the unmanned aerial vehicle 10. The battery 11 may be fixed in the unmanned aerial vehicle 100, or may be removable.

Motor 12 and Rotor 13

The motor 12 functions as a drive source for rotating the rotor 13 using electric power supplied from the battery 11. The unmanned aerial vehicle 10 can take off and fly through the rotation of the rotor 13.

Control Unit 14

The control unit 14 is provided with a central processing unit (CPU), a random access memory (RAM), a read-only memory (ROM) and the like.

In addition, the control unit 14 reads specified programs so as to implement an image acquisition module 141 and a position acquisition module 142.

The control unit 14 controls the motor 12 to control the flying of the unmanned aerial vehicle 10 (ascending, descending, moving horizontally, etc.). In addition, the control unit 14 uses a gyroscope (not shown) disposed in the unmanned aerial vehicle 10 to control the motor 12 for action control of the unmanned aerial vehicle 10.

Position Detection Unit 151 and Height Detection Unit 152)

The position detection unit 151 and the height detection unit 152 includes laser imaging detection and ranging (LIDAR) technology and global positioning system (GPS) technology, and uses the LIDAR technology and the GPS technology to detect the latitude, longitude and height of the actual flying position of the unmanned aerial vehicle.

Shooting Angle Detection Unit 153

The shooting angle detection unit 153 includes an angle detection sensor and has a function of detecting the shooting angle of the camera 17 disposed in the unmanned aerial vehicle 10.

Drive Circuit 16

The drive circuit 16 has a function of applying a voltage designated by a control signal from the control unit 14 to the motor 12. Therefore, the drive circuit 16 can drive the motor 12 according to the control signal from the control unit 14.

Camera 17

The camera 17 functions as an aerial device. The camera 17 converts an optical image taken in by lens of CCD, CMOS and other photographing elements into image signals. The type of the camera 17 may be selected according to an image parsing mode of the photographed object.

Storage Unit 18

The storage unit 18 is a device storing data and files, and is provided with a data storage unit storing implemented by a hard disk, a semiconductor memory, a recording medium, a storage card, etc. In addition to a control program storage region (not shown) for storing in advance a control program or the like executed by the microcomputer of the control unit 14, the storage unit 18 includes an image data storage region 181 for storing image data taken by the camera 17 and three-dimensional coordinate data (which is equivalent to latitude, longitude and height data of a spot corresponding to the taking position of the image taken by the camera 17) detected by both the position detection unit 151 and the height detection unit 152.

It is to be noted that images constituting the image data may be static images, or may be dynamic images. In addition, the data stored in the image data storage region can be transferred to the computer 30 through a portable recording medium such as a USB memory, an SD card, etc.

Wireless Communication Unit 19

The wireless communication unit 19 is configured to execute wireless communication with the controller 20 and receive a remote-control signal from the controller 20.

Controller 20

The controller 20 has a function of operating the unmanned aerial vehicle 10. The controller 20 is provided with: an operate unit 21, which is configured to be used when the user operates the unmanned aerial vehicle 10; a control unit 22, which is configured to control the action of the controller 20; a storage unit 23, which is configured to pre-store a control program executed by the microcomputer of the control unit 22; a wireless communication unit 24, which is configured to execute wireless communication with the unmanned aerial vehicle 10; and an image display unit 25, which is configured to display a specified image to the user.

The wireless communication unit 24 is configured to execute wireless communication with the unmanned aerial vehicle 10 and receive a remote-control signal from the unmanned aerial vehicle 10.

The image display unit 25 may be integrated with the operate device for operating the unmanned aerial vehicle 10, or may be separated from the operate device. If the image display unit 25 is integrated with the operate device, the number of devices used by the user may be reduced, improving convenience. In a case that the image display unit 25 is separated from the operate device, the image display unit 25 can lift a portable terminal device such as a smartphone and a tablet terminal that can be wirelessly connected to the wireless communication unit 19 of the unmanned aerial vehicle 10. In a case that the image display unit 25 is separated from the operate device, there is an advantage: the existing operate device without the image display unit 25 may also be adopted.

Computer 30

The computer 30 has a function of executing instructions which take into consideration the privacy and intention of the owner of the land which is taken into the aerial image. The computer 30 is provided with: an input unit 31, which is used by the user to input instruction information; a control unit 32, which is configured to control the action of the computer 30; a storage unit 33, which is configured to pre-store a control program executed by a microcomputer of the control unit 32; and an image display unit 34, which is configured to display a specified image.

The control unit 32 reads specified programs so as to implement a region designation module 321, a condition setting module 322 and a provision module 323.

The storage unit 33 is provided with: an image data storage region 331 for storing image data transferred by a portable recording medium such as a USB memory and an SD card and stored in the storage unit 18 of the unmanned aerial vehicle 10; a viewing authorization database 332, which stores information on conditions for canceling viewing restriction and granting viewing authorization in regions where viewing is restricted; and an owned land information database 333, which is configured to store information on owned lands such as membership-based address information Flowchart Illustrating an Image Providing Method Using the Image Providing System 1

Figure 2:
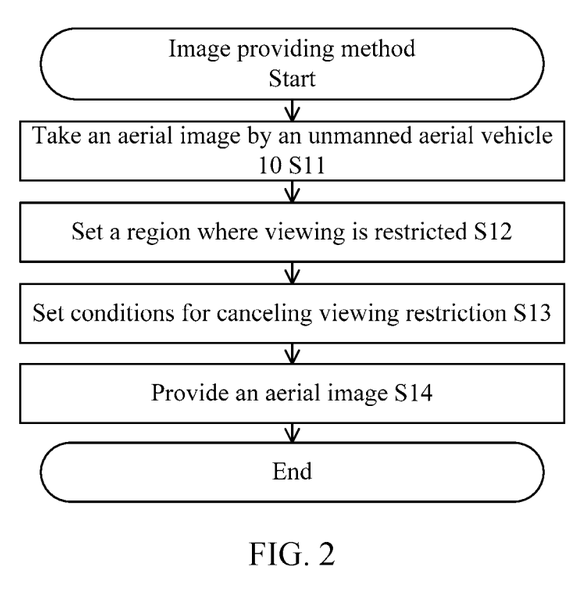
FIG. 2 is a flowchart illustrating an image providing method in an embodiment.

FIG. 2 is a flowchart illustrating an image providing method using the image providing system 1. The processing executed by various hardware and software modules described above will be described.

Step S11: Taking an Aerial Image by an Unmanned Aerial Vehicle 10

First, a control unit 14 in the unmanned aerial vehicle 10 makes the unmanned aerial vehicle 10 fly along a specified flight route. Then the control unit 14 in the unmanned aerial vehicle 10 executes an image acquisition module 141 to make the camera 17 in the unmanned aerial vehicle 10 to take an aerial image (step S11).

If the unmanned aerial vehicle 10 takes images right below itself in the gravity direction, it is not difficult to acquire positional information of the unmanned aerial vehicle 10 during flying. However, the direction in which the unmanned aerial vehicle 10 takes images is not limited to the gravity direction, and in this case, the region where the aerial image is taken may not be consistent with the detection position of the position detection unit 151 disposed in the unmanned aerial vehicle 10. It is preferable to correct the position coordinates covered by the region of the aerial image.

Therefore, in this embodiment, preferably, the control unit 14 executes the position acquisition module 142 to acquire positional information (positional coordinates) of the region of the aerial image from detection results of the position acquisition unit 151, the height detection unit 152 and the shooting angle detection unit 153.

Figure 3:
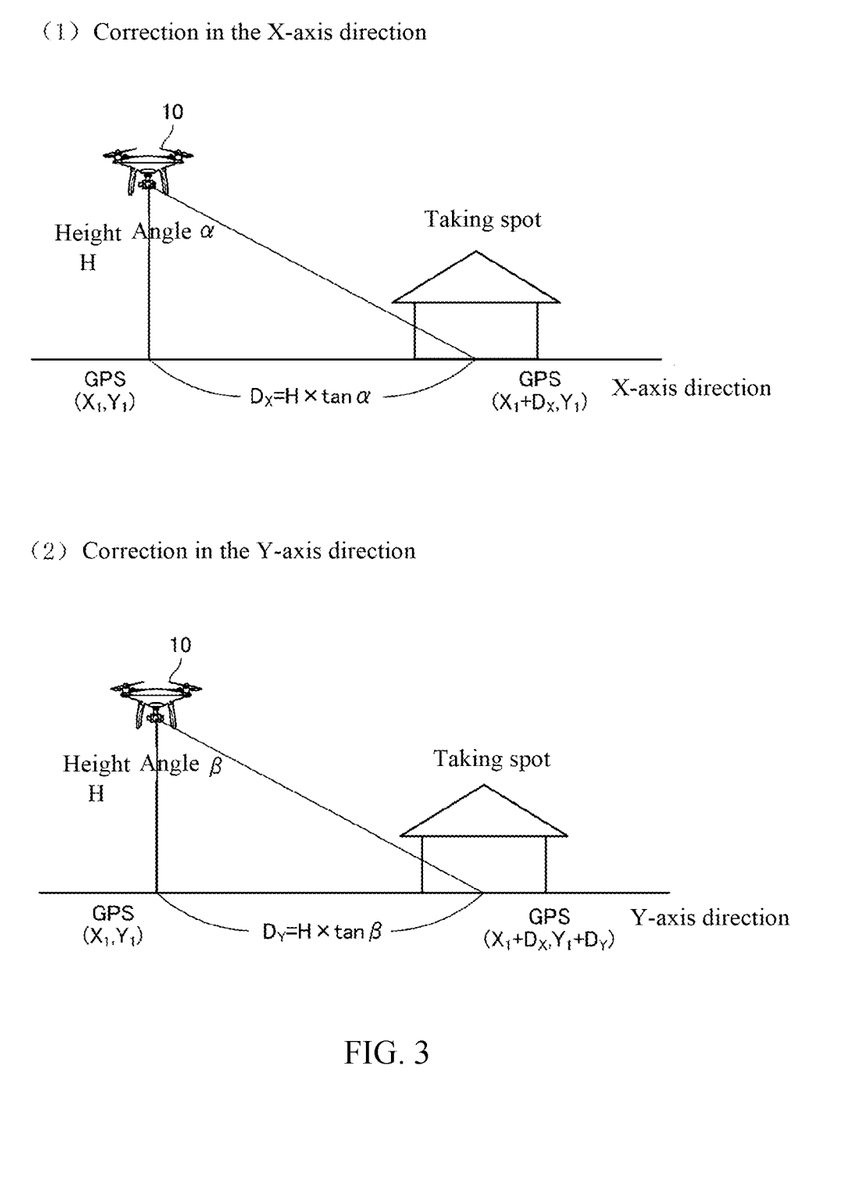
FIG. 3 is a schematic diagram illustrating a mechanism for acquiring positional information (positional coordinates) of a region taken into an aerial image.

FIG. 3 is a schematic diagram illustrating a mechanism for acquiring positional information (positional coordinates) of a region taken into an aerial image.

Through the position detection unit 151, the latitude (X coordinates) $X_1$ and longitude (Y coordinates) $Y_1$ of the unmanned aerial vehicle 10 are detected. Through the height detection unit 152, the height H of the unmanned aerial vehicle 10 is detected. In addition, through the shooting angle detection unit 153, a shooting angle in the latitude direction (X direction) and a shooting angle in the longitude direction (Y direction) of the camera 17 are detected as $\alpha$ and $\beta$ respectively.

As shown in (1) of FIG. 3, the detection position of the position detection unit 151 disposed in the unmanned aerial vehicle 10 is shifted by H×tan $\alpha$ in the latitudinal direction (X direction) from the position of the spot where the aerial image is taken. Therefore, the X coordinate of the taking spot is $X_1$+H×tan $\alpha$.

In addition, as shown in (2) of FIG. 3, the detection position of the position detection unit 151 disposed in the unmanned aerial vehicle 10 is shifted by H×tan $\alpha$ in the longitude direction (Y direction) from the position of the spot where the aerial image is taken. Therefore, the Y coordinate of the taking spot is $Y_1$+H×tan $\beta$.

Therefore, more accurate positional information (positional coordinates) of a region where the aerial image is take may be acquired.

Data of the aerial image taken by the camera 17 and the positional information are stored in an image data storage region 181. It is to be noted that images may be static images, or may be dynamic images.

When the flying of the unmanned aerial vehicle 10 along the specified route finishes, the control unit 14 in the unmanned aerial vehicle 10 stops taking aerial images using the camera 17, and the unmanned aerial vehicle 10 lands. In addition, the information stored in the image data storage region 181 is placed in the image data storage region 331 of the computer 30 through a portable recording medium such as a USB memory, an SD card, etc.

Step S12: Setting a Region Where Viewing is Restricted

See FIG. 2. A control unit 32 in the computer 30 executes a region designation module 321, and the aerial image stored in the image data storage region 331 is displayed in an image display unit 34. The administrator is prompted to perform the operation of setting a region where viewing is restricted with respect to the aerial image displayed on the image display unit 34 (step S12).

Figure 4:
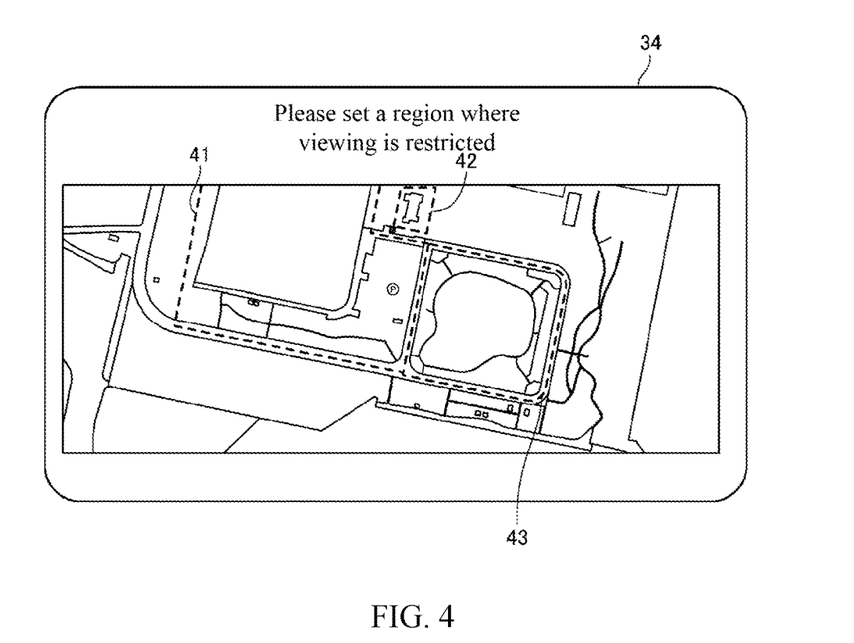
FIG. 4 is an example of a setting picture of viewing restriction.

FIG. 4 is a display example of the image display unit 3 in this case. On the upper part of the image display unit 34, "please set a region where viewing is restricted" is displayed. On the lower part, the aerial image is displayed. As shown by reference numerals 41 to 43, the administrator does the following operation: encircling corresponding regions of private lands such as residential area, buildings, farmland and so on as regions where viewing is restricted.

Figure 5:
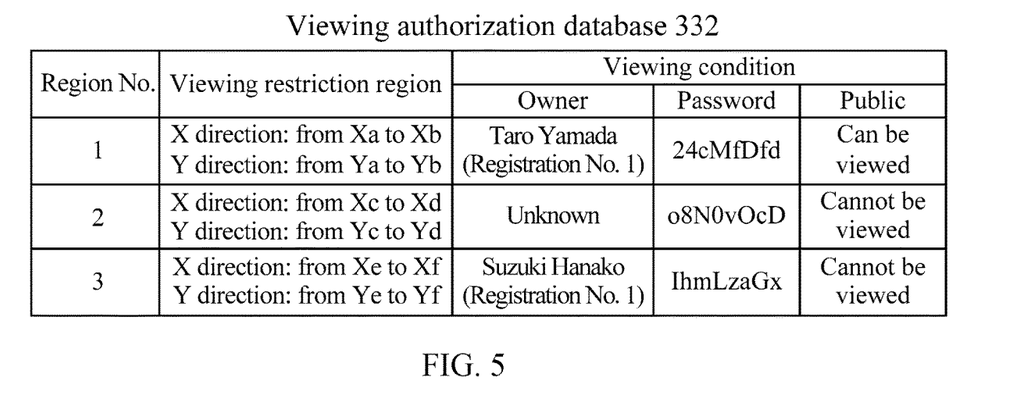
FIG. 5 is an example of a viewing authorization database 332.

FIG. 5 is an example of a viewing authorization database 332 set in the storage unit 33. In the viewing authorization database 332, a correspondence is established between the region set by the administrator where viewing is restricted and information on coordinates of the region and information on conditions for canceling the viewing restriction.

In the processing of the step S12, according to the operation of the administrator, among items in the viewing restriction region of the viewing restriction database 332, information on coordinates of the region is set in each region set by the administrator where viewing is restricted.

Step S13: Setting Conditions for Canceling Viewing Restriction

See FIG. 2. The control unit 32 of the computer 30 executes a condition setting module 322 to set conditions for canceling the viewing restriction and granting viewing authorization in each region where viewing is restricted set in the processing of the step S12 (step S13).

As shown in FIG. 1, an owned land information database 333 is set in the storage unit 33, and in this owned land information database 333, information on the address of a member to whom the manager of the image providing system 1 provides a service, and the like are registered in advance.

Figure 6:
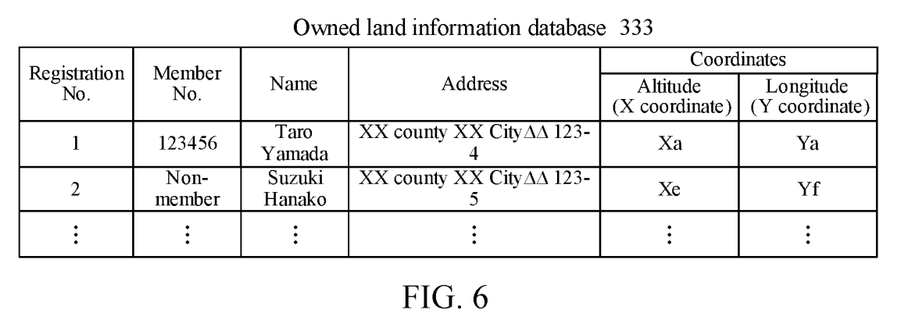
FIG. 6 is an example of an owned land information database 332.

FIG. 6 is an example of an owned land information database 333. A correspondence is established between a registration number and information on a member number, a member name, a member address and coordinates (latitude and longitude) corresponding to the address in the owned land information database 333.

For example, information on the address of Taro Yamada (a member to whom the manager of the image providing system 1 provides the service with member No.: 123456) as well as coordinates of the address is stored.

According to coordinate information registered in the owned land information database 333, the control unit 32 determines whether the coordinate information is included in coordinates of a region where viewing is restricted and which is registered in the viewing authorization database 332. In a case that the coordinate information is included in the coordinates, the control unit 32 considers that the region where viewing is restricted is consistent with the owned land, and sets information of this owner into a position of owners of viewing conditions in the viewing authorization database 332.

In a case that this owner accesses the image, the control unit 32 cancels the viewing restriction of the region which is consistent with the owned land.

Using FIG. 6 as an example, for Taro Yamada whose registration No. is 1, the latitude (X coordinate) and longitude (Y coordinate) of his address are Xa and Ya respectively with reference to the coordinate information registered in the owned land information database 333. The coordinates (Xa, Ya) are included in coordinates of a region registered as region No.: 1 in the viewing authorization database 332. Therefore, the control unit 32 considers that the region where viewing is restricted is consistent with the owned land, and sets information of Taro Yamada into the position of owners of viewing conditions in the viewing authorization database 332.

In a case of confirming that Taro Yamada accesses the image, the control unit 32 cancels the viewing restriction of the region which is consistent with the owned land of Taro Yamada, that is, a region corresponding to region No.: 1 (reference numeral 41 in FIG. 4).

It is preferable, though not necessarily required, to set password information for canceling viewing restriction in the viewing authorization database 332 (FIG. 3). For example, the control unit 32 displays a password for canceling viewing restriction on the terminal of the owner of the region where viewing is restricted. This owner only needs to input the password on another terminal which is not his own terminal when he wants to view the aerial image on this terminal. In this way, the owner of the land having regions where viewing is restricted may view the aerial image of this land even on other terminals other than his own terminal.

In addition, it is preferable, though not necessarily required, to set a range of viewing restriction in the viewing authorization database 332 (FIG. 3). For example, the control unit 32 displays a picture for setting a range of viewing restriction on the terminal of the owner of the region where viewing is restricted. This owner chooses whether to let the aerial image of his land to be viewed on a terminal of a general user. In a case that the aerial image is set to be capable of being viewed, the viewing state of the public terms in the viewing authorization database 332 (FIG. 3) is updated from "cannot be viewed" into "can be viewed". In this way, viewing conditions can be set according to the intention of the owner of the land having regions where viewing is restricted.

In addition, it is preferable, though not necessarily required, that an aerial image of a land of an owner who is not the member to whom the manager of the image providing system 1 provides the service may be displayed when this land owner applies for displaying the aerial image of the land. Using FIG. 6 as an example, Suzuki Hanako with registration No.: 2 is not the member to whom the manager of the image providing system 1 provides the service. Therefore, even if her land is taken into the aerial image, Suzuki Hanako cannot view the aerial image of her land in the initial stage.

Then, Suzuki Hanako applies to the manager for viewing the aerial image of her land. In this case, in order to prevent false applications, it is preferable to confirm the application through some official documents such as a copy of a driver's license, a copy of a resident card, or the like. If the document is confirmed to be true, the manager sets the information on Suzuki Hanako in the owned land information database 333. In this way, Suzuki Hanako may also view the aerial image of her land.

Step S14: Providing an Aerial Image

See FIG. 2. The control unit 32 of the computer 30 executes a provision module 322 to determine whether there is a region satisfying conditions for granting viewing authorization in the aerial image which includes the region where viewing is restricted according to the viewing authorization database 332. The control unit 32 provides an aerial image in which a region where conditions for granting viewing authorization are satisfied is displayed while a region where the conditions for granting viewing authorization are not satisfied is not displayed (Step S14).

Figure 7:
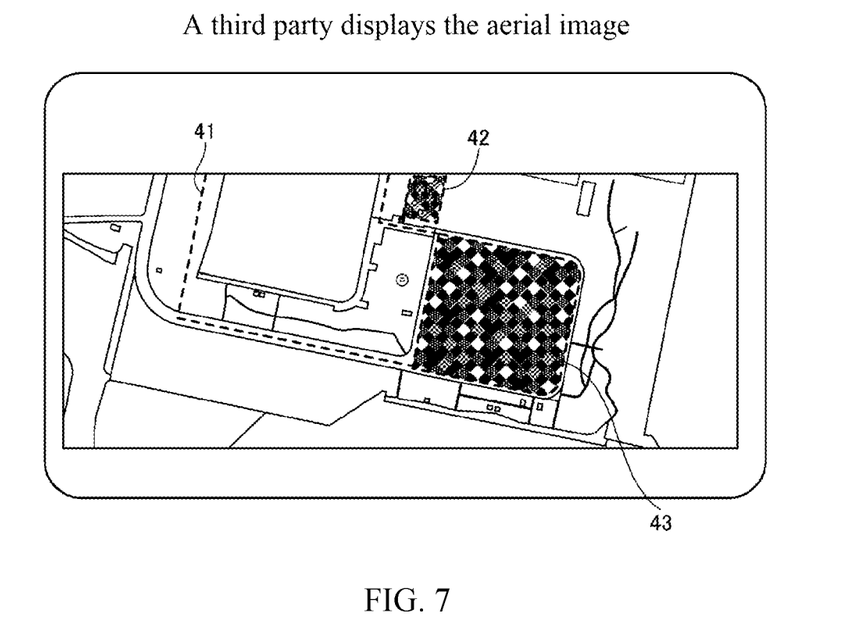
FIG. 7 is a display example that a third party who is not registered in the owned land information database 333 displays an aerial image on his terminal.

FIG. 7 is a display example that a third party who is not registered in the owned land information database 333 displays an aerial image on his terminal (not shown). According to the viewing authorization database 332, a viewing state of the region No.: 1 (reference numeral 41 in FIG. 7) to the public is "can be viewed", so it satisfies the condition for granting viewing authorization. On the other hand, the viewing state of the region No.: 2 (reference numeral 42 in FIG. 7) and the region No.: 3 (reference numeral 43 in FIG. 7) to the public is "cannot be viewed", so they do not satisfy the condition for granting viewing authorization. Therefore, the region marked by the reference numeral 41 is displayed, and regions marked by the reference numerals 42 and 43 are not displayed (which are covered by mosaics).

Figure 8:
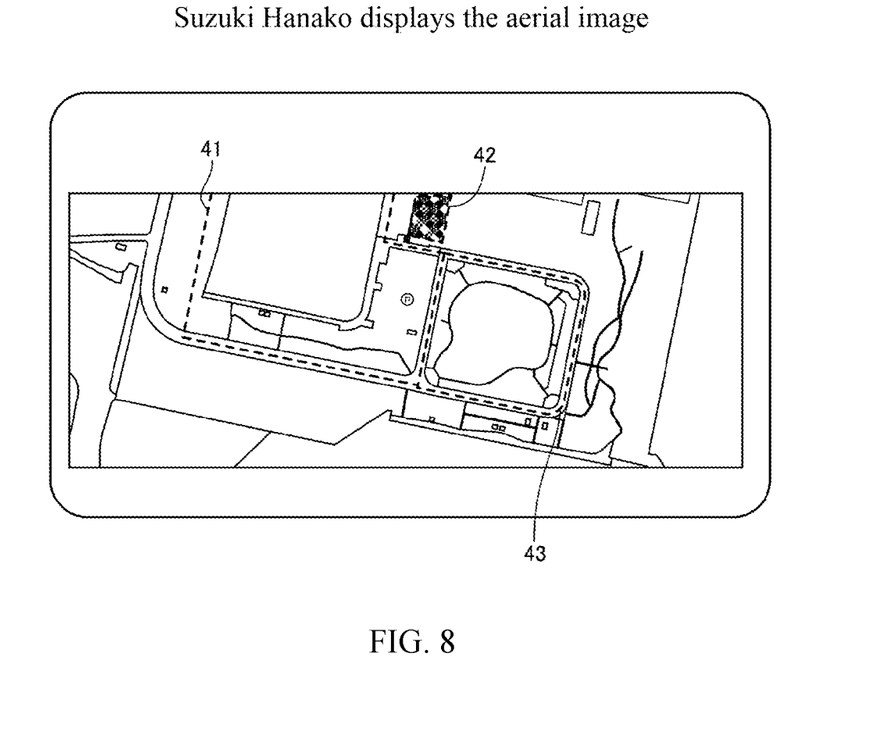
FIG. 8 is a display example that an owner who is registered in the owned land information database 333 displays an aerial image on his terminal (not shown).

FIG. 8 is a display example that Suzuki Hanako who is registered in the owned land information database 333 displays an aerial image on her terminal (not shown). According to the viewing authorization database 332, a viewing state of the region No.: 1 (reference numeral 41 in FIG. 7) to the public is "can be viewed", so it satisfies the condition for granting viewing authorization. In addition, the region No.: 3 (reference numeral 43 in FIG. 7) is identified as the land of the owner, so it satisfies the condition for granting viewing authorization. On the other hand, the viewing state of the region No.: 2 (reference numeral 42 in FIG. 7) to the public is "cannot be viewed", so it does not satisfy the condition for granting viewing authorization. Therefore, regions marked by the reference numerals 41 and 43 are displayed, and the region marked by the reference numeral 42 is not displayed (which is covered by mosaics).

When the processing of the step S14 is finished, the image providing system 1 finishes a series of processing of the image providing method of this embodiment.

According to the invention described in this embodiment, viewing is restricted in a specified region in the aerial image taken by the unmanned aerial vehicle 10. The condition for canceling the viewing restriction and granting viewing authorization is set for each region where viewing is restricted. A processed aerial image is provided: an aerial image which includes the region where viewing is restricted, and for the aerial image which includes the region where viewing is restricted, display a region where the condition is satisfied while not display a region where the condition is not satisfied.

Therefore, a system in which hardware and software cooperate with each other and in which a condition for canceling viewing restriction and granting viewing authorization is set to conditions that take into consideration the privacy and intention of the owner of the land taken into the aerial image when images taken in a wide range by an unmanned aerial vehicle 10 are widely provided to the public can be provided. Once the conditions are set, there is no need to consume labor to obtain permission, and thus a system which can reduce labor consumed for obtaining permission as much as possible and sufficiently take into consideration the privacy and intention of the owner of the land which is taken into the aerial image can be provided.

In addition, according to the invention described in this embodiment, the owned land information database 333 receives information on an owned land of a user. The conditions for canceling viewing restriction and granting viewing authorization include a condition in which the region where viewing is restricted is consistent with the owned land. Therefore, a system in which hardware and software cooperate with each other and in which the setting of the condition for canceling viewing restriction and granting viewing authorization becomes automatic through the reception of the information of the owned land from the user can be provided. Therefore, the labor consumed for obtaining permission of the land owner can be further reduced.

In addition, the invention described in this embodiment acquires positional information of the aerial image from a position detected by the position detection unit 151 of the unmanned aerial vehicle 10, a height detected by the height detection unit 152 and an image shooting angle of the camera 17 detected by the shooting angle detection unit 153. Therefore, the positional information of the aerial image may also be correct even in the case in which the unmanned aerial vehicle 10 does not take the image below itself (in the gravity direction) but takes the image in a tilted direction. Therefore, a deviation between the land owner predicted from the positional information included in the aerial image and the actual land owner may be suppressed, and thus a system which can reduce labor consumed for obtaining permission as much as possible and further take into consideration the privacy and intention of the owner of the land which is taken into the aerial image can be provided.

The above units and functions described above are implemented when a computer (including a CPU, an information processing device or other terminals) reads and executes a specified program. The program is provided by being recorded in a computer-readable recording medium such as a soft disc, a CD (CD-ROM, etc.), a DVD (DVD-ROM, DVD-RAM, etc.) and the like. In this case, the computer reads the program from the recording medium, transfers the program to an internal storage device or an external storage device, and stores and executes the program. In addition, the program may be pre-recorded in a storage device (recording medium) such as a magnetic disk, an optical disk, and a magneto-optical disk, and provided to the computer from the storage device via a communication line.

The embodiments of the present invention have been described above, but the present invention is not limited to the above embodiments. In addition, the effects described in the embodiments of the present invention are merely examples of the most suitable effects produced by the present invention, and the effects of the present invention are not limited to the effects described in the embodiments of the present invention.

DESCRIPTION OF THE REFERENCE NUMERALS

1 image providing system;
10 unmanned aerial vehicle;
11 battery;
12 motor;
13 rotor;
14 control unit;
141 image acquisition module;
142 position acquisition module;
151 position detection unit;
152 height detection unit;
153 shooting angle detection unit;
16 drive circuit;
17 camera;
18 storage unit;
181 image data storage region;
19 wireless communication unit;
20 controller;
30 computer;
31 input unit;
32 control unit;
321 region designation module;
322 condition setting module;
323 provision module;
33 storage unit;
331 image data storage region;
332 viewing authorization database;
333 owned land information database; and
34 image display unit.

What is claimed is:

1. An image providing system, configured to provide an image taken by an unmanned aerial vehicle, comprising:
   at least one processor and a memory storing processor-executable instructions, wherein when the instructions are executed by the at least one processor causes the at least one processor to perform:
   acquiring an aerial image comprising positional information from the unmanned aerial vehicle;
   setting regions of the aerial image where viewing is restricted;
   setting information on coordinates of each of the regions where viewing is restricted and a condition for canceling the viewing restriction and granting viewing authorization for each of the regions where viewing is restricted; and
   providing an aerial image which comprises the regions where viewing is restricted, and for the aerial image which comprises the regions where viewing is restricted, displaying a region where the condition for granting viewing authorization is satisfied while not displaying a region where the condition for granting viewing authorization is not satisfied;
   wherein the system further comprises:
   determining whether coordinate information is comprised in coordinates of a region where viewing is restricted and which is registered in a viewing authorization database;
   in a case where the coordinate information is included in the coordinates, determining that the region where viewing is restricted is consistent with an owned land, setting information of an owner into a position of owners of viewing conditions in the viewing authorization database, canceling the view restriction of the region which is consistent with the owned land in a case where the owner accesses the image.

2. The image providing system of claim 1, further comprising:
receiving information on the owned land from a user;
wherein the condition comprise a condition in which one of the regions where viewing is restricted is consistent with the owned land.

3. The image providing system of claim 2, further comprising:
acquiring positional information of the aerial image from a position detected by a position detection device disposed in the unmanned aerial vehicle, a height of the unmanned aerial vehicle and an image shooting angle of an image capturing device disposed in the unmanned aerial vehicle.

4. The image providing system of claim 1, further comprising:
acquiring positional information of the aerial image from a position detected by a position detection device disposed in the unmanned aerial vehicle, a height of the unmanned aerial vehicle and an image shooting angle of an image capturing device disposed in the unmanned aerial vehicle.

5. An image providing method, configured to provide an image taken by an unmanned aerial vehicle, comprising:
acquiring an aerial image comprising positional information from the unmanned aerial vehicle;
setting regions where viewing is restricted in the aerial image;
setting a condition for canceling the viewing restriction and granting viewing authorization for each of the regions where viewing is restricted; and
providing an aerial image which comprises the regions where viewing is restricted, and for the aerial image which comprises the regions where viewing is restricted, displaying a region where the condition for granting viewing authorization is satisfied while not displaying a region where the condition for granting viewing authorization is not satisfied;
wherein the method further comprises:
determining whether coordinate information is comprised in coordinates of a region where viewing is restricted and which is registered in a viewing authorization database;
in a case where the coordinate information is included in the coordinates, determining that the region where viewing is restricted is consistent with an owned land, setting information of an owner into a position of owners of viewing conditions in the viewing authorization database, canceling the view restriction of the region which is consistent with the owned land in a case where the owner accesses the image.

6. A program, configured to enable an image providing system which provides an image taken by an unmanned aerial vehicle to execute steps as follows:
acquiring an aerial image comprising positional information from the unmanned aerial vehicle;
setting regions where viewing is restricted in the aerial image;
setting a condition for canceling the viewing restriction and granting viewing authorization for each of the regions where viewing is restricted; and
for an aerial image which comprises the regions where viewing is restricted, displaying a region where the condition for granting viewing authorization is satisfied while not displaying a region where the condition for granting viewing authorization is not satisfied;
wherein the program further comprises:
determining whether coordinate information is comprised in coordinates of a region where viewing is restricted and which is registered in a viewing authorization database;
in a case where the coordinate information is included in the coordinates, determining that the region where viewing is restricted is consistent with an owned land, setting information of an owner into a position of owners of viewing conditions in the viewing authorization database, canceling the view restriction of the region which is consistent with the owned land in a case where the owner accesses the image.

* * * * *